Nov. 6, 1928.
H. I. WASHBURN
1,690,761
AGRICULTURAL APPARATUS
Original Filed July 10, 1926      9 Sheets-Sheet 1
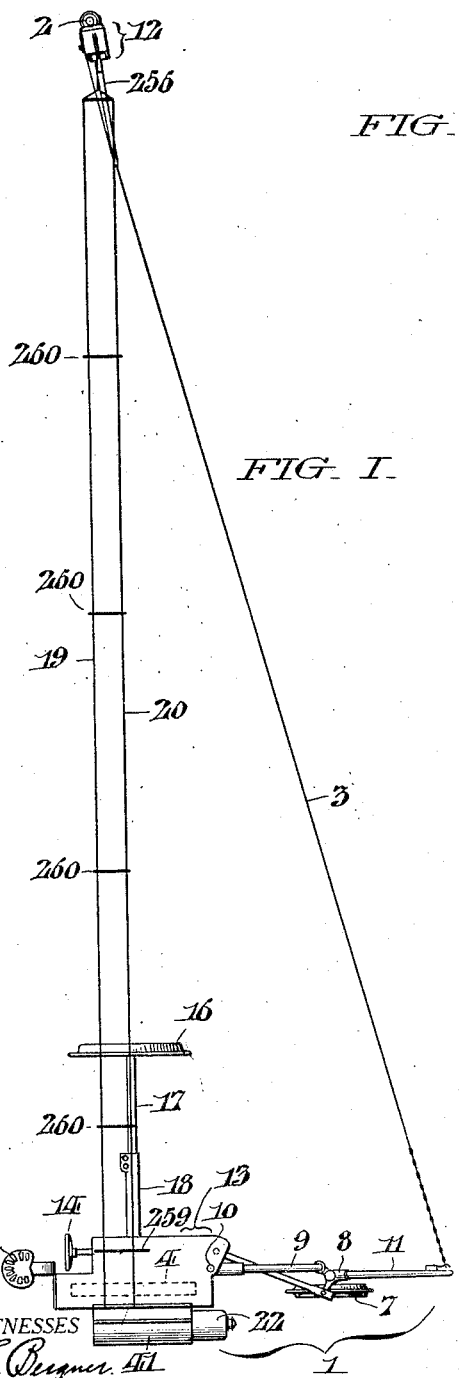
FIG. I.
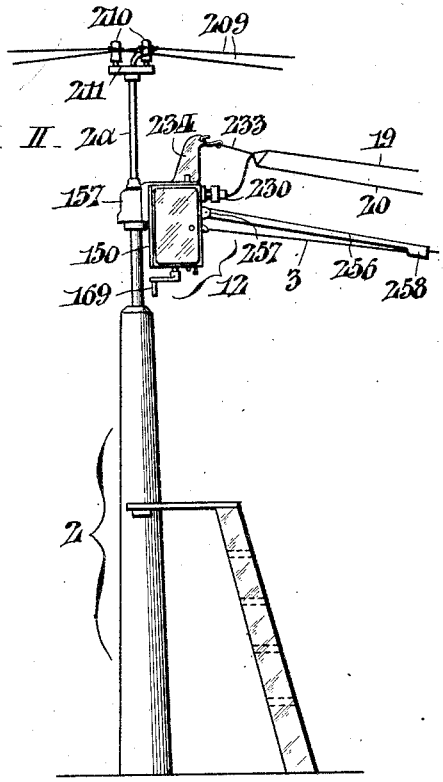
FIG. II.
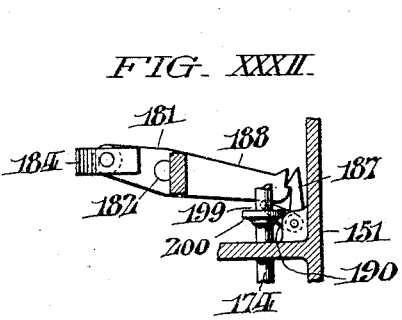
FIG. XXXII.
WITNESSES
INVENTOR:
Herbert I. Washburn,
BY
ATTORNEYS.

Nov. 6, 1928.
H. I. WASHBURN
AGRICULTURAL APPARATUS
Original Filed July 10, 1926    9 Sheets-Sheet 2
1,690,761
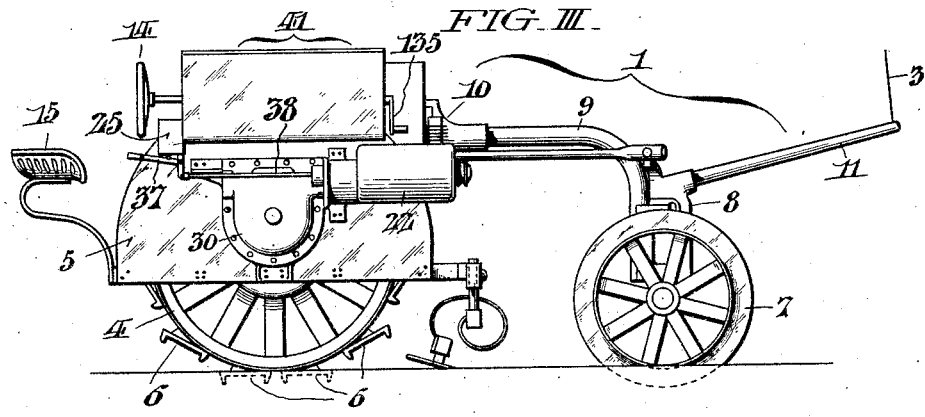
FIG. III.
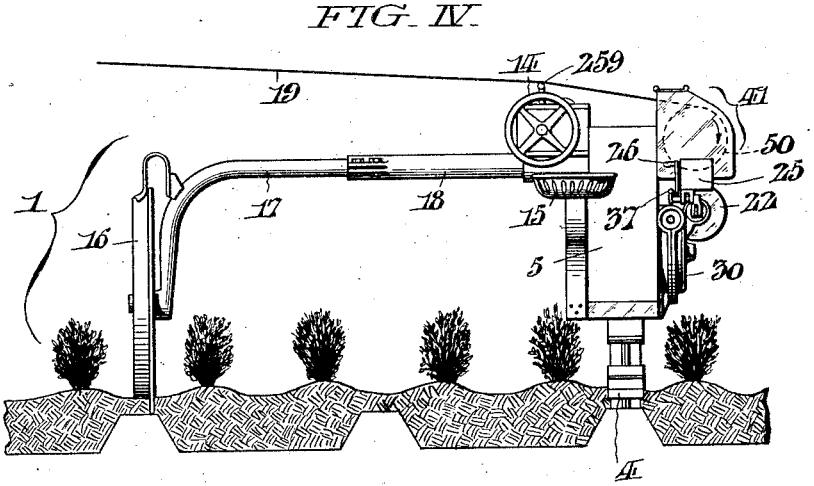
FIG. IV.
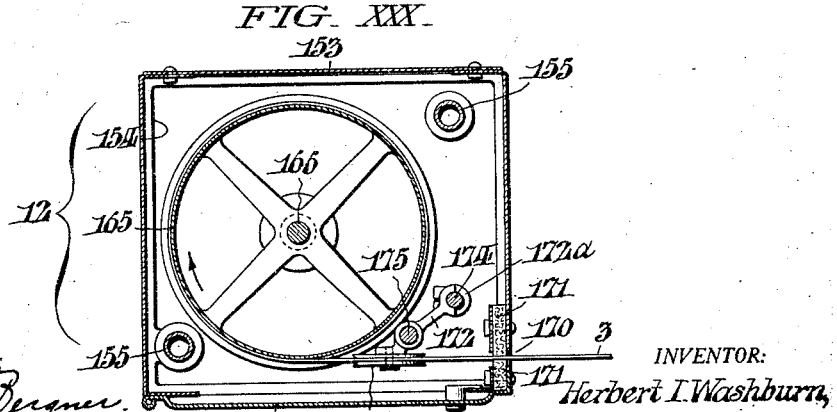
FIG. XXX.
INVENTOR:
Herbert I. Washburn,
BY
ATTORNEYS.

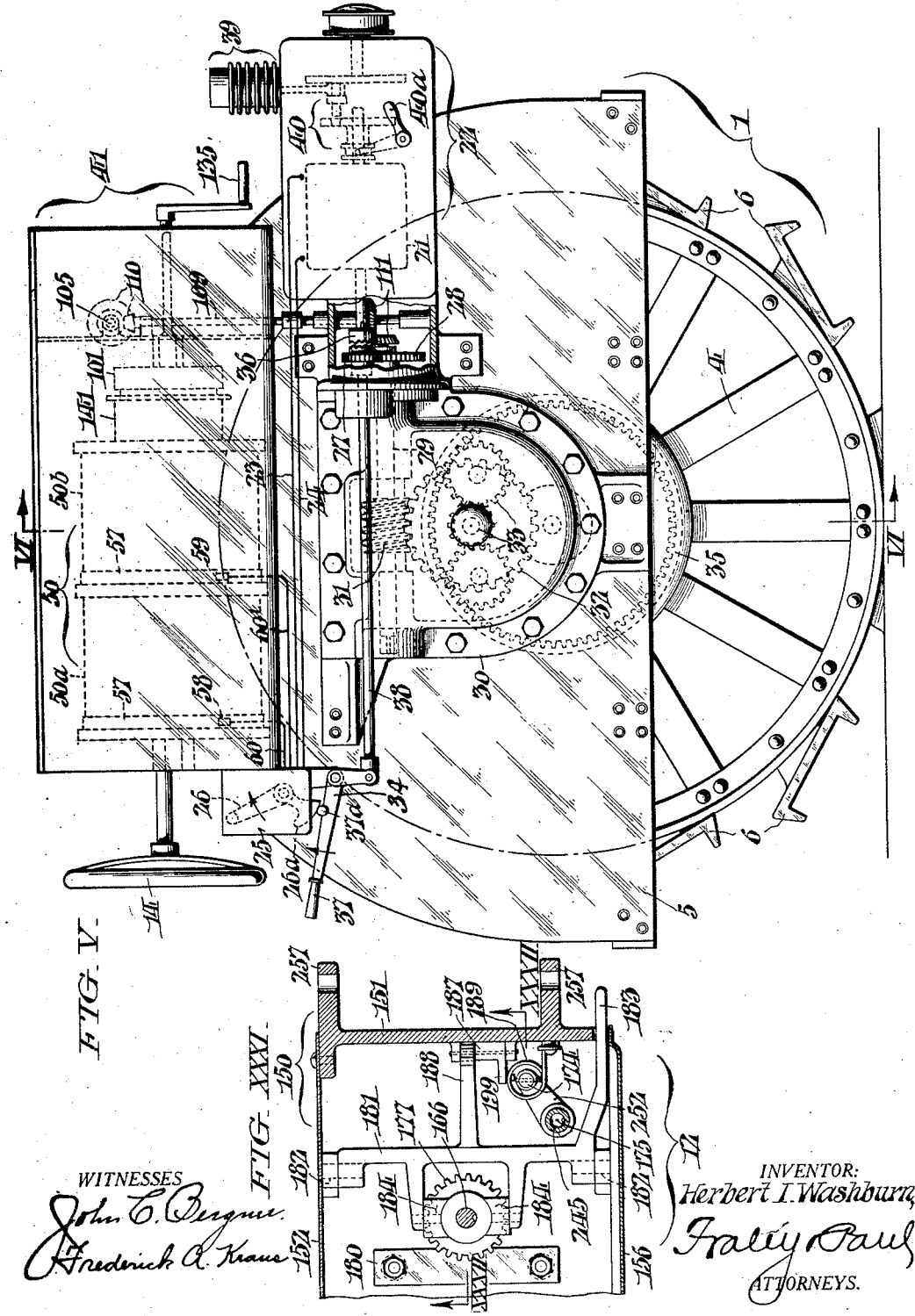

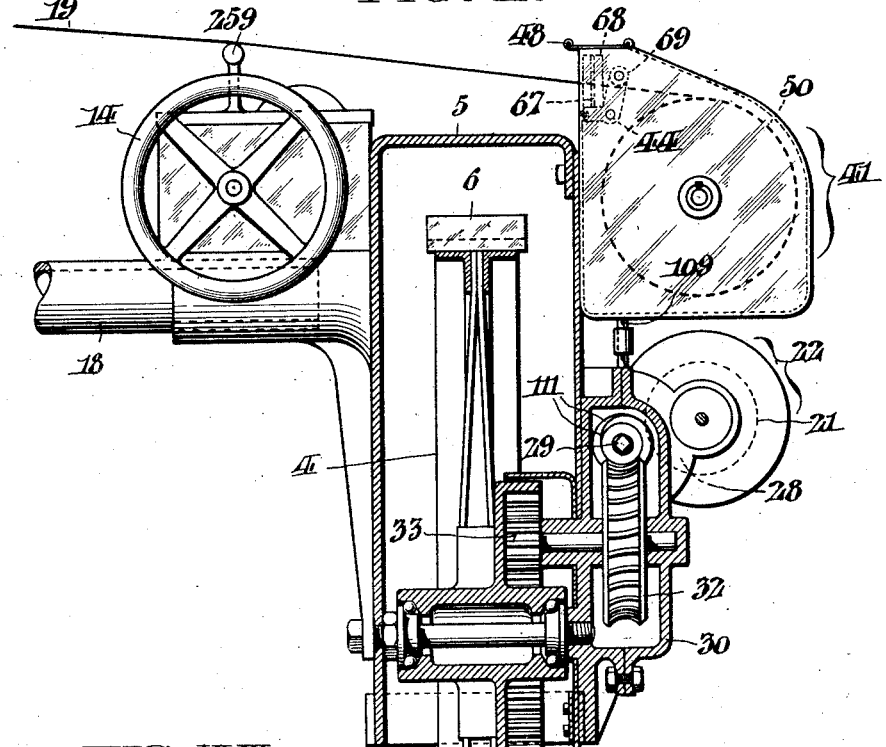

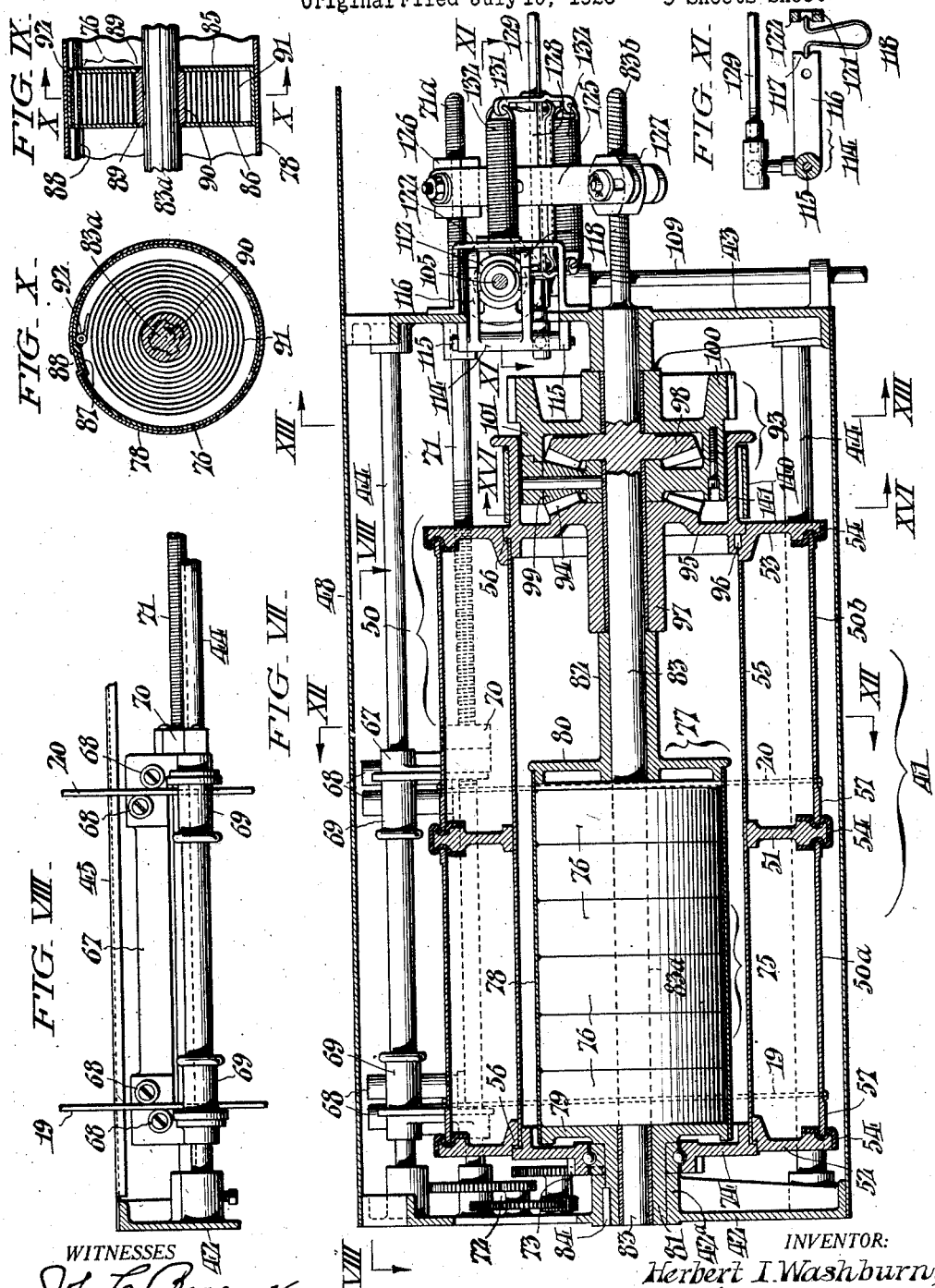

Nov. 6, 1928.
H. I. WASHBURN
1,690,761
AGRICULTURAL APPARATUS
Original Filed July 10, 1926    9 Sheets-Sheet 6
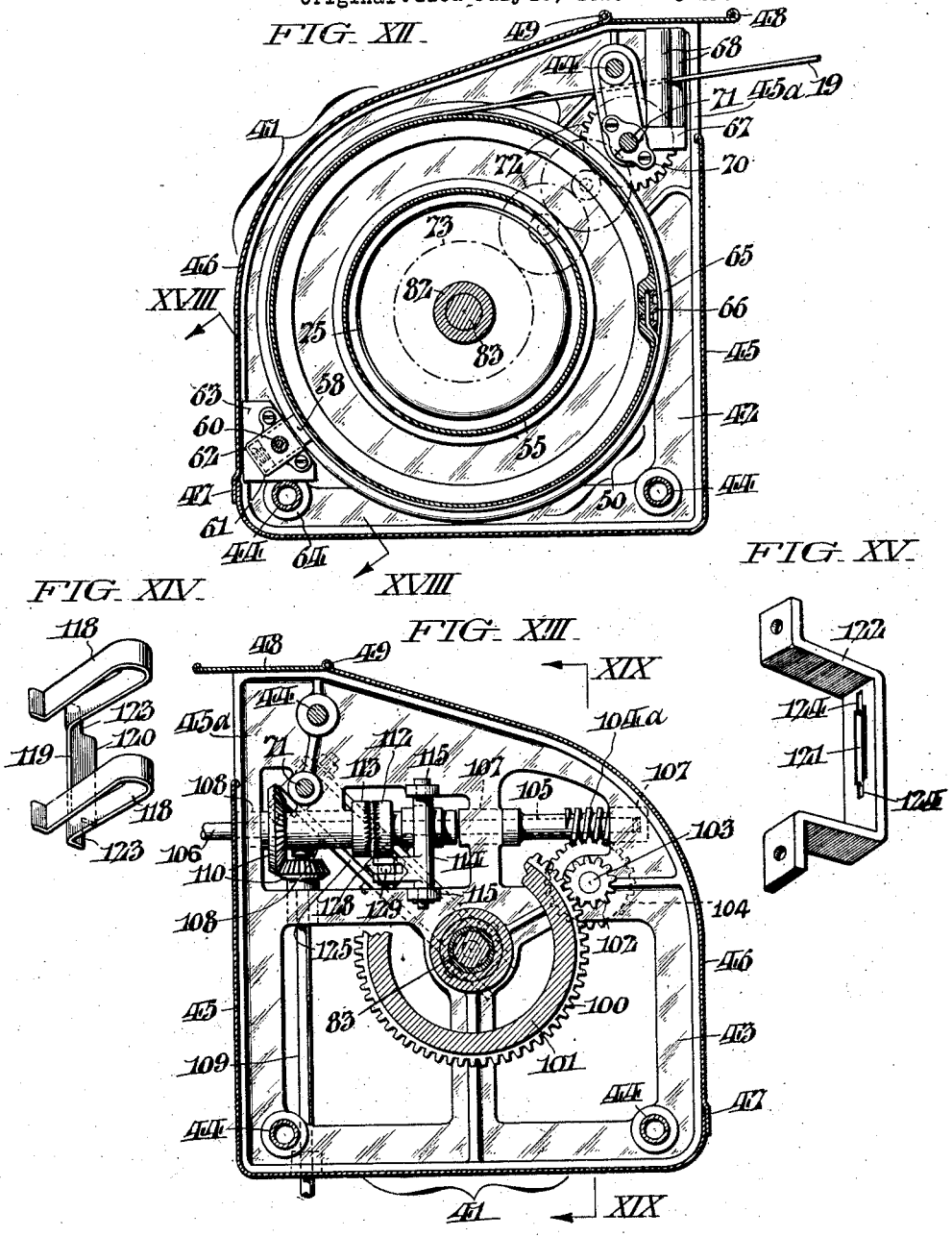
INVENTOR:
Herbert I. Washburn,
BY
ATTORNEYS.

Nov. 6, 1928.
H. I. WASHBURN
1,690,761
AGRICULTURAL APPARATUS
Original Filed July 10, 1926   9 Sheets-Sheet 7
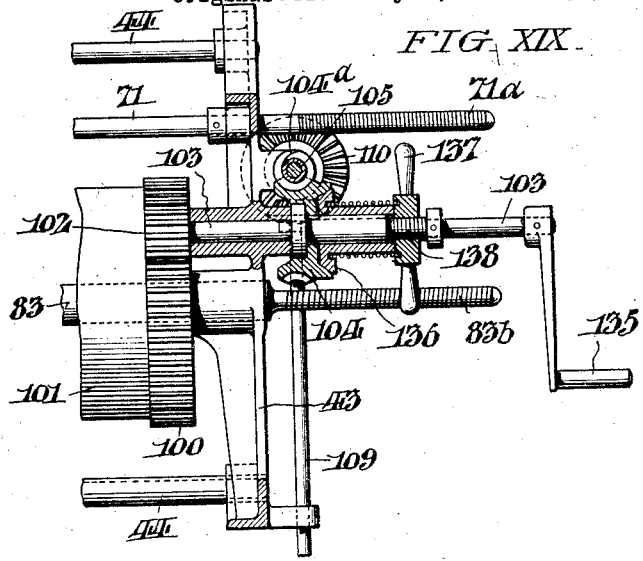
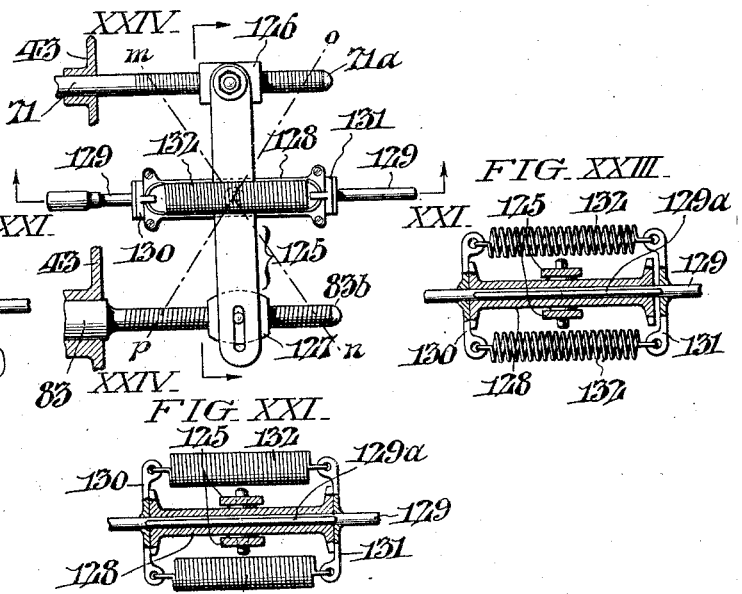
WITNESSES
John E. Bergner
Frederick A. Kraus
INVENTOR:
Herbert I. Washburn,
Foley Paul
ATTORNEYS.

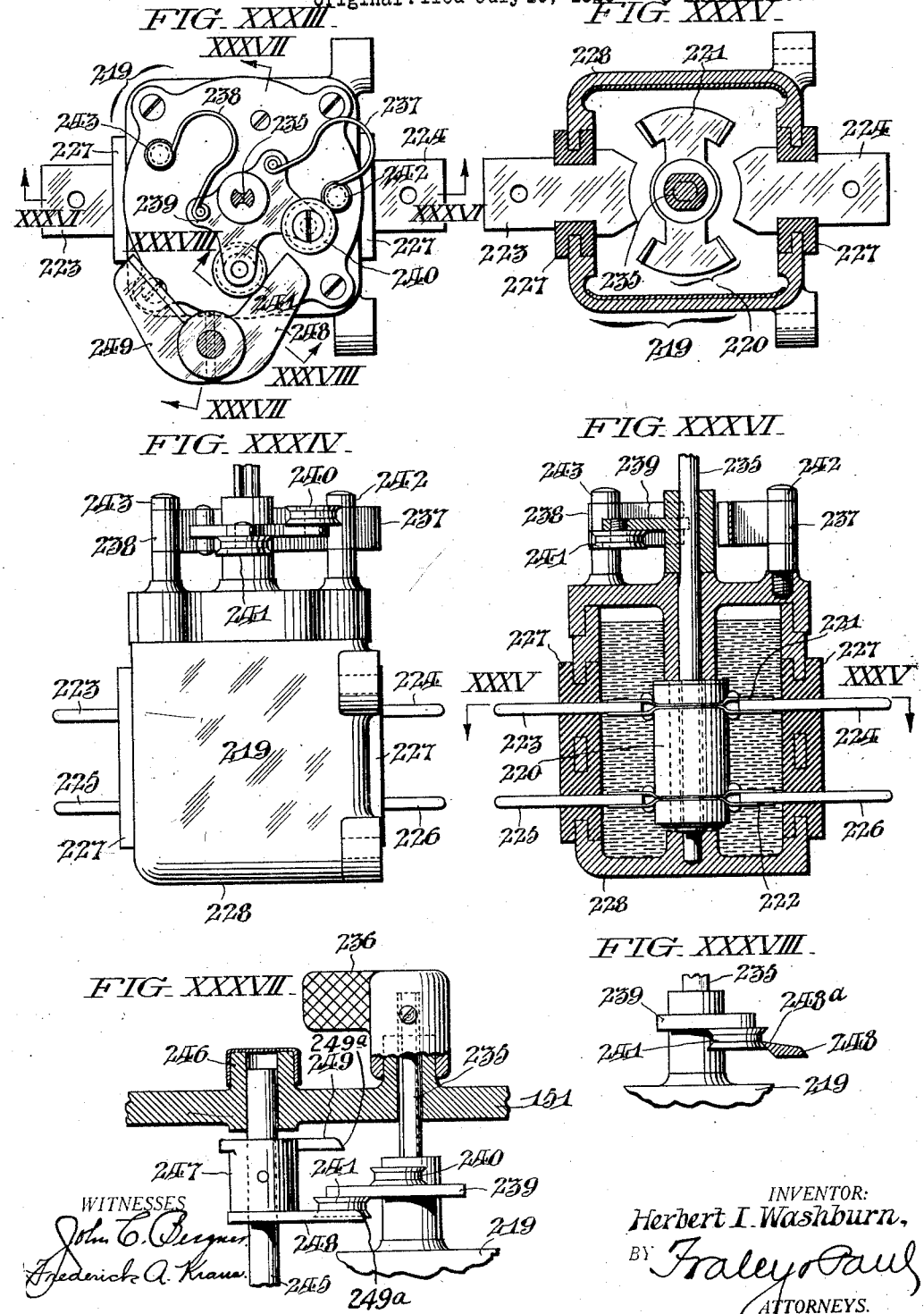

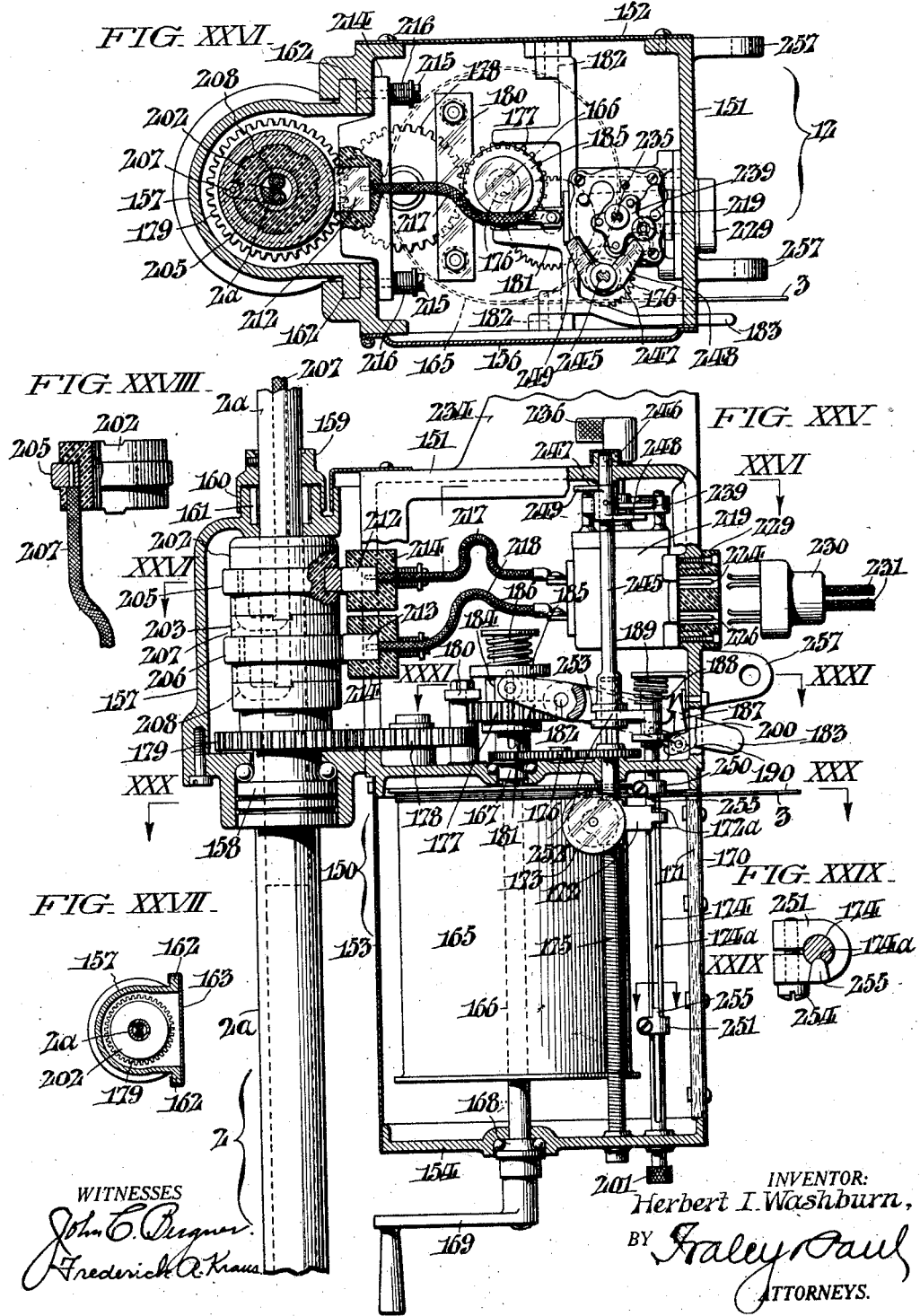

Patented Nov. 6, 1928.

1,690,761

UNITED STATES PATENT OFFICE.

HERBERT I. WASHBURN, OF MAGNOLIA, NEW JERSEY.

AGRICULTURAL APPARATUS.

Application filed July 10, 1926, Serial No. 121,514. Renewed March 8, 1928.

This invention relates to agricultural apparatus of the type shown and described in U. S. Letters Patent No. 1,087,620 granted to me under date of February 17, 1914, wherein the tool carrying tractor element (sometimes referred to as a syn-motor) is independently movable and confined to circular or spiral travel about a fixed center post in plowing or cultivating a field.

In the main, my present invention is concerned with electrification of such agricultural apparatus, or in other words, to enable use of electric power in propelling the tractor element in lieu of the internal combustion motors heretofore employed for the purpose. In this connection, I also aim to provide automatic means capable of taking up (or letting out) upon the conductors carrying the electric current, (which may be either direct or alternating) from the field center post to the tractor element, concurrently with variation in the radius determining the spiral travel, and at the same time of compensatively regulating the tension of the conductors in accordance with variation in their span—that is to say—to maintain said conductors just sufficiently taut at all times to prevent sagging without inducing harmful strains in them.

My invention is further concerned with means capable of being set to automatically shut off the supply of current to the tractor element after a predtermined extent or period of travel thereof, i. e., after a predetermined area of the field has been worked upon.

Other objects and attendant advantages of my invention will become readily apparent from the detailed description hereinafter of the typical embodiment illustrated in the drawings.

Fig. I is a plan view showing the complete apparatus set up in readiness for operation.

Fig. II is an elevation of the tether or field center post (with its appendages) about which the tractor element travels.

Fig. III is a side elevation of the tractor element on a larger scale than in Fig. I.

Fig. IV is a rear view of the same.

Fig. V shows a side view of the main portion of the tractor element in part section and in greater detail than depicted in Fig. III.

Fig. VI is a sectional view taken as indicated by the arrows VI—VI in Fig. V.

Fig. VII is a longitudinal sectional view of the reeling mechanism for the conductors carrying the electric current from the tether post to the tractor element incidental to the travel of the latter.

Fig. VIII is a fragmentary detail sectional view taken locally as indicated by the arrows VIII—VIII in Fig. VII.

Fig. IX is a fragmentary longitudinal sectional view through one of the units of the spring motor employed in connection with the conductor reeling mechanism of Fig. VII.

Fig. X is a traverse section taken as indicated by the arrows X—X in Fig. IX.

Fig. XI is a detail plan sectional view taken locally as indicated by the arrows XI—XI in Fig. VII.

Fig. XII is a cross section view through the conductor reeling mechanism as viewed in the direction of the arrows XII—XII in Fig. VII.

Fig. XIII is a similar cross section taken as indicated by the arrows XIII—XIII in Fig. VII.

Fig. XIV is a perspective view of a spring element associated with a clutch forming part of the reeling mechanism.

Fig. XV is a perspective view of the anchorage bracket for the spring of Fig. XIV.

Fig. XVI is a fragmentary cross section taken locally as indicated by the arrows XVI—XVI in Fig. VII.

Fig. XVII is a fragmentary sectional view taken as indicated by the arrows XVII—XVII in Fig. XVI.

Fig. XVIII is a view taken as indicated by the arrows XVIII—XVIII in Fig. XII showing the details of one of the electric contact brushes engaging the drum sections upon which the conductors are respectively wound.

Fig. XIX is a fragmentary sectional view of automatic tension regulating means associated with the conductor reeling mechanism, the section being taken as indicated by the arrows XIX—XIX in Fig. XIII.

Fig. XX is a fragmentary plan view of the tension regulating means aforesaid.

Fig. XXI is a detail sectional view taken as indicated by the arrows XXI—XXI in Fig. XX.

Figs. XXII and XXIII are illustrations similar to Fig. XXI showing the parts in different operative positions.

Fig. XXIV is a sectional view taken as indicated by the arrows XXIV—XXIV in Fig. XX.

Fig. XXV is a view of the reeling mechanism for the steering wire by which the movements of the tractor element are guided from the tether post, certain portions being broken away and shown in section in this illustration to better portray important details.

Fig. XXVI is a staggered plan section taken approximately as indicated by the arrowed line XXVI—XXVI in Fig. XXV.

Fig. XXVII is a sectional view similar to Fig. XXVI, though on a smaller scale, showing a cover plate employed after removal of the guide wire reeling mechanism, to close the opening in the swivel fitting on the tether post.

Fig. XXVIII is a detail view, partly in section and partly in elevation, of one of the collector collars from which electric current is taken as the tractor element travels about the tether post.

Fig. XXIX is a detail section taken locally as indicated by the arrows XXIX in Fig. XXV.

Fig. XXX is a plan sectional view of the guide wire reeling mechanism taken in accordance with the arrows XXX—XXX in Fig. XXV.

Fig. XXXI is a fragmentary plan sectional view taken as indicated by the arrows XXXI—XXXI in Fig. XXV.

Fig. XXXII is a staggered section taken locally as indicated by the arrows XXXII—XXXII in Fig. XXXI.

Figs. XXXIII and XXXIV are respectively a plan view and side elevation of a snap switch for controlling the supply of electric power to the tractor element.

Figs. XXXV and XXXVI are respectively a plan and an axial sectional view of the switch.

Fig. XXXVII is a detail sectional view taken as indicated by the arrows XXXVII—XXXVII in Fig. XXXIII; and Fig. XXXVIII is still another detail sectional view taken locally as indicated by the arrows XXXVIII—XXXVIII.

In the complete assemblage of Fig. I, my agricultural apparatus is shown as comprising an independently movable tool-carrying tractor element 1 adapted to travel about a tether post 2, in the center of a field, under guidance of a connecting steering wire 3, see Fig. II also. Progression of the tractor element 1 is induced by rotation of its bull wheel 4 (Figs. III, IV and V), the same being housed in a guard casing 5 suitably secured to the frame of said tractor element, and preferably equipped with pivoted spur pads or shoes 6 to insure effective tractive engagement with the ground. Curvilinear travel of the tractor element 1 is determined through movement of a steering wheel 7 which is mounted on a fitting 8 pivotally connected to the outer end of a radius arm 9, the latter being in turn pivoted at 10 to the tractor frame. A boom 11 projecting forward from the swivel fitting 8 of the steering wheel 7 is connected, by the guide or steering wire 3, with reeling mechanism 12 (to be later described in detail) on the tether post 2 whereby said wire is gradually taken up (or let out) to determine spiral travel of the tractor element 1. Proper tracking of the bull wheel 4 in tangential relation to the prescribed curvature of travel of the tractor element 1 is predetermined automatically by mechanism partly indicated at 13 in Fig. I. This mechanism may be similar in construction and operation to that disclosed in my Patent No. 1,454,093 dated May 8, 1923, and need not therefore be further referred to herein. When necessary, the tractor element 1 can be guided manually by a hand wheel 14 which is conveniently accessible from the seat 15 provided for the operative, see Figs. I, III and IV. As a means to stabilize the tractor element 1, I mount an auxiliary wheel 16 to the end of an out-rigger arm 17 capable of telescopic adjustment in a lateral tubular projection 18 of the tractor frame, see Figs. I and IV. Electric current is supplied to the tractor element 1 by conductors 19 and 20 from the tether post 2, where connection is made to a power line as will be more fully explained presently.

The means directly instrumental in propelling the bull wheel 4 of the tractor element 1 in accordance with my present invention, includes an electric motor which is diagrammatically shown by dotted outline at 21 in Fig. V. This motor 21 is enclosed in an appropriate protective housing 22 on the tractor frame, and connected by leads 23, 24 with a starter box 25 adapted to be controlled by a hand lever 26. The motor 21 serves to drive the pinion 27 of a sprocket chain connection 28 with a counter-shaft 29 that is journalled in a gear housing 30 at the side of the guard 5. A worm 31 on the shaft 29 imparts motion to a worm wheel 32, which, through a system of spur pinions 33, drives an internal gear 35 bolted or otherwise secured to the bull wheel 4. To enable connection and disconnection of the drive gearing just described, I provide clutch means whereof the collar 36 is splined on the shaft of motor 21 for shifting into—and out of—engagement with the sprocket pinion 27 by means of a handle 37 (fulcrumed on a depending bracket 34 of the starter box 25) and an interposed coupling link rod 38, all as shown in Fig. V. For the purpose of preventing premature shifting of the clutch collar 36 before the motor 21 has attained speed in starting, and also to prevent accidental interruption of current to said motor under load, subsequently, I equip the control lever 26 with a sector 26a for cooperation with a lug 37a on the handle 37 in a manner obvious from Fig. V.

As an auxiliary drive means, I preferably employ a small air-cooled internal combustion engine 39, the same being mounted on the tractor frame to the right of the electric motor 21. The engine 39 may be coupled with the motor 21 by clutch means 40 through shifting of a handle 40a, and can thus be used when the tractor element 1 is to be moved about from place to place as in positioning it in readiness for electric operation.

The reeling mechanism for the conductors 19, 20 is comprehensively designated at 41, and, as shown in Fig. V, is mounted on the tractor frame above the electric motor casing 22 and the gear housing 30. The skeleton structure wherein the various movable parts of the reeling mechanism 41 are journalled, comprises end frames 42, 43 (Fig. VII) which are rigidly united in spaced relation by transverse tie rods 44. The working parts are protected in an enclosure formed by separately removable sheet metal wall sections 45, 46 which envelop the skeleton frame structure aforesaid and overlap as at 47 in Figs. XII, XIII. A cover 48 swingable about a hinge connection 49 with the section 46, renders the interior of the enclosure accessible for inspection of the parts within. The winding drum 50 for the conductors 19, 20, which enter the enclosure through an opening 45a, embodies two axially-alined sections 50a, 50b that are electrically insulated from one another as well as from the central and end spiders 51 and 52, 53 respectively of said drum, through interposition of suitable gaskets of di-electric material 54. The winding drum parts thus far described are permanently secured together by a coaxial sleeve or shell 55 whose extremities are flanged over as at 56 within recesses of the end spiders 52, 53. The conductors 19, 20 are bare, and in making metallic contact with the respective drum sections 50a, 50b, the turns are short circuited as fast as they are formed, thereby preventing the coils from acting as electro-magnets. The drum sections 50a, 50b have raised circumferential ridges 57, 57 affording bearing surfaces for contact brushes 58, 59 which are respectively connected by leads 60, 60' with the starting box 25, see Fig. V. As detailed in Fig. XII, the brushes 58, 59 are slidable in holders 61, and urged forward by compression springs 62 to bear against the drum sections 50a, 50b, said holders being secured to insulation blocks 63 which are in turn fixed to bracket arms 64 fastened on one of the tie bars 44 previously mentioned. The ends of the conductors 19, 20 are retroverted and lodged in recesses in the faces of the winding drum 50 after the manner shown at 65 in Fig. XII, a clamp block 66 being in each instance used to anchor the conductor end firmly in place. Uniform spooling of the conductors 19, 20 is determined, incidental to rotation of the drum 50, by a guide 67 arranged to travel longitudinally of said drum along an upper tie rod 44. The guide 67 carries upstanding insulation rollers 68 which are arranged in pairs and spaced for passage of the conductors between them, as well as horizontal insulating rollers 69 to prevent said conductors from rising from between the rollers 68 aforesaid, see Figs. VIII and XII. Progression of the guide 67 is effected through the engagement of a split nut 70 thereon with a feed screw-shaft 71 that has journal bearing at opposite extremities in the end frames 42, 43. Rotary movement is transmitted to the screw-shaft 71 through a train of reduction spur wheels 72 (Figs. VII and VIII) including a gear 73 formed on the head 74 which is fixed to the drum end spider 52 and closes one end of the internal tubular sleeve or shell 55. The means to maintain the conductors 19, 20 at all times under sufficient tension against sagging and also to wind them upon the drum 50, is in the form of a spring motor 75 herein shown as located axially within the hollow of the inner drum sleeve 55. This spring motor 75 embodies a series of individual spring units 76, whereof one is detailed in Figs. IX and X, the group being accommodated in a separate cylindric housing 77 axially within the tubular sleeve or shell 55 of the winding drum 50. The shell 78 of the housing 77 is supported between heads 79, 80 with axial bosses 81, 82 in which a shaft 83 is journalled for independent rotation. The shell and head parts 78, 79 respectively are welded or otherwise secured together and are held from rotation by virtue of a key connection at 84 of part 79 with the central boss 42a of the end frame 42; while the head part 80 has slip fit engagement with the shell 78. As shown in Figs. IX, X, the cup shaped casing member 85 of each of the spring units 76 is closed by a cover disk 86, said casing member being notched at 87 to engage a longitudinal recess 88 of the housing shell 78 so as to be held stationary within the latter. Both spring unit casing members 85, 86 are axially apertured as at 89 to engage between them an independently-rotative shouldered collar 90, said collar having a slotted bore to fit the fluted portion 83a of the shaft 83 so as to turn with the latter. The flat spiral spring shown at 91 has one end connected permanently to the shouldered collar 90, and the other end, at 92, to the inner peripheral face of its casing member 85, and therefore exerts its influence, in company with similar springs of the other units 76, in tending to rotate the shaft 83 in a clockwise direction, as considered in Fig. XII. Such movement is communicated to the winding drum 50—subject to compensative regulation—by means including a bevel differential 93 whereof the gear 94 is integrally formed with the head 95 which closes the right hand end of the sleeve or shell 55 (Fig. VII), while it is keyed at 96 to the corresponding drum end spider 53. The spring motor shaft 83 is free to rotate in the axial bearing boss 97 of the head 95, and, beyond said boss, carries the opposing bevel gear 98 of the differential. The common differential pinion 99 is mounted on a rotor 101 which is free on the shaft 83 and formed with a spur gear 100 that meshes with a pinion 102 on a short countershaft 103 having bearing in the end frame 43, see Figs. XIII, XIX. The counter-shaft 103 is rotated by worm gear 104 driven by the worm 104a which is fixed on one of the sections 105, 106 of a divided shaft journalled in bearings 107 and 108 of the end frame 43. The shaft section 106 is constantly driven from the shaft 29, previously mentioned (Fig. V), through the medium of a transmission system embodying a vertical shaft 109 having bevel gear connections 110—111 top and bottom with said shafts 105 and 29 respectively. Coupling of the shaft sections 105, 106 is effected through shifting of a toothed clutch member 112 (Fig. XIII), splined on the first mentioned section 105, into engagement with a corresponding clutch member 113 on the second 106, by means of a yoke 114 which is pivoted at 115, 115 to the end frame 43, and whose arms 116 are notched as at 117 in Fig. XI to take the ends of bow springs 118. These springs 118 are joined by an integral cross connection 119 (Fig. XIV) whereof the extended tongue 120 engages through an opening 121 in a supplemental lateral bridging bracket 122 bolted to the frame 43, while the shoulders 123 at each side of the said tongue rest within retaining cuts 124 above and below the bracket opening 121. The action of the bow springs 118, it will be seen, is such as to tend to maintain the clutch member 112 either in its active or inactive position.

Functioning of the clutch yoke 114 is controlled by the compensating means detailed in Figs. XX–XXIV; which, as shown, comprises a lever 125 that has pivotal connection at opposite extremities with nuts 126, 127 engaging the oppositely threaded ends of the shafts 71, 83 protruding through the frame 43, the threads being of different pitch for differential action. The lever 125 also has pivotal connection at the center with a member 128 composed of two parts which slidingly engage between them a connecting rod 129 that extends to the clutch yoke 114, see Figs. VII–XI. This connecting rod 129 has a winged key 129a which is coextensive with the member 128 and normally wholly within the latter as shown in Fig. XXI. Cross arms 130, 131 loosely fitting the rod 129 are normally held against the ends of the two-part member 128 by tension springs 132 spanned between their respectively opposite extremities. Thus, when the lever 125 is moved to the left of its *normal neutral* position—as shown in Fig. XXIII—consequent upon the action of the screw thread 83b, the two-part member 128 in responding to such movement, carries the cross arm 130 with it; while the other cross arm 131 is restrained through contact of the contiguous end of the winged key 129a. The connecting rod 129 is thereupon urged inward under reaction of the tension springs 132, and the clutch member 112 brought into engagement with its fellow 113. This is followed by rotation of the the shaft 83 through the interposed worm gearing 104, 104a and the differential 93 in a manner obvious from Fig. VII, to wind up the units 76 of the spring motor 75. Such action will, obviously, continue until the normal re-adjustment is re-established in the parts of the reeling mechanism 41 by reverse operation of the compensating means.

The spring motor 75 is initially wound up by a hand crank 135 at the outer end of the counter-shaft 103 which carries the pinion 102, see Fig. XIX. To do this, however, it is first necessary to disconnect it from the previously described compensative mechanism by which it is controlled. Accordingly, the worm gear 104 is loosely mounted in the counter-shaft 103 with capacity to run free (except for a certain amount of braking friction) upon withdrawal of a spring-pressed-cone-clutch collar 136 by means of a hand wheel 137 having screw threaded engagement at 138 with said shaft.

The action of the winding drum 50 is snubbed by a brake band 140 (Figs. VII, XVI and XVII) embracing an integral annular pulley-like extension 141 at the right hand head 95 of the sleeve or shell 55. One end of the brake band 140 is attached to a collar 142 on one of the tie rods 44, and the other to a lever 143 which is free on said tie rod. A coiled torsion spring 144, influential upon the lever 143, normally maintains the brake band 140 in tension for maximum braking effect. By means of a handle 145, the lever 143 may be turned in opposition to the spring 144 to slack the brake band 140 and render the winding drum 50 free for manually reeling in any remaining lengths of the conductors 19, 20 after the tractor element 1 has completely traversed the field.

As shown in Fig. II the reeling mechanism 12 for the guide wire 3 is supported by the tether post 2 with capacity to revolve freely about the upper reduced tubular end 2a of the latter. The parts of this reeling mechanism 12 are protected in a box-like enclosure 150 whereof the top section has the form of an integral casting or closure member 151 (see Figs. XXV and XXVI) with the back closed by a removable sheet metal panel 152, while the lower section has back and side walls 153 of sheet metal and a bottom 154 suspended by tie rods 155, Fig. XXX, from the upper section 151, both sections being accessible through a hinged door 156 at the front. The reeling mechanism 12 is entirely removable from the tether post 2 except for a hollow swivel fitting 157 which is supported about the upper portion 2a of said post by a ball thrust bearing 158, upward displacement thereof being prevented by a collar 159 with a circumferential apron 160 surrounding a roller bearing 161 at the top to preclude access of water or moisture to the latter. The open side of the swivel fitting 157 is flanked by lateral flanges 162 to provide a sliding connection for the enclosure member 151 as best shown in Fig. XXVI. With this construction it will be apparent that the box-like enclosure 150, together with all its appurtenances, may be readily dislodged—simply by lifting it relative to the swivel fitting 157—for removal from the tether post 2 and storage with the rest of the apparatus when not in use. A cover plate such as shown at 163 in Fig. XXVII may, thereafter, be substituted to protect the parts within the hollow of the swivel fitting 157 from the weather. The winding drum 165 for the steering wire 3 is secured on a shaft 166 extending vertically through the lower section 153 of the box-like enclosure 150 and journalled in ball bearings 167, 168. The guide or steering wire 3 enters the box-like enclosure 150 through a slot 170 formed between the swinging edge of the door 156 and the side wall, the slot being faced with felt 171 or other suitable absorbent material capable of retaining fluid lubricant for wiping said wire as it is spooled on the winding drum 165. The latter operation is effected with the aid of a spooling guide 172 which carries a grooved roller 173 for engaging the wire 3, and which is movable up and down along a vertical rod 174 under the influence of a feed screw 175 whereto rotative movement is imparted direct from the drum shaft 166 through the medium of a gear train shown at 176 in Figs. XXV, XXVI. The winding drum 165 derives motion as a result of bodily revolution of the reeling mechanism 12 around the tether post 2. The parts instrumental in determining this include a spur pinion 177 on the drum shaft 166, and cooperative planetary gears 178, 179 whereof the latter is fixed to the post 2 within the hollow of the swivel fitting 157. The spur pinion 177 is splined to the drum shaft 166 and is shiftable up and down into meshing engagement either with the planetary gear 178 aforementioned when the drum 165 is to be rotated, or with a stationary toothed plate 180 to lock said drum against rotation when required or desired. As a means to enable such shifting of the spur pinion 177, I provide a clutch yoke 181 that is pivoted at 182, 182 and has a handle 183 which extends to the exterior through a slot in the side wall of the enclosure 150. Blocks 184 of fiber—or the like—having pivotal connection with the clevis arms of the yoke 181, engage in the interval between the upper face of the spur pinion 177 and a disk 185 also splined on the drum shaft 166. This disk 185 is maintained in frictional contact with the fiber blocks 184 by a compression spring 186 and thus prevents spinning of the winding drum 165 during unwinding of the guide wire 3 (during initial setting up of the apparatus) when the spur pinion 177 is in the neutral position shown in the drawings. For the purpose of temporarily maintaining the spur pinion 177 in the neutral position, I employ a pivoted hook 187 adapted to engage a supplemental arm 188 of the clutch yoke 181 as shown in Fig. XXXII. This hook 187 is tripable by upward thrust of the rod 174 against the action of a spring 189 (Fig. XXV), and is accordingly provided with a finger 190 that projects into the path of a disk collar 200 on said rod. For convenience in shifting it as just explained, the rod 174 extends down beneath the enclosure 150 where it is equipped with a knurled finger knob 201. The portion of the tether post 2 between the planetary gear 179 and the upper roller bearing 161 of the swivel fitting 157, is occupied by a pair of fixed collars 202, 203 with medial sections 204 of insulation with imbedded contact rings 205, 206 that have slight circumferential projection, as shown in Figs. XXV and XXVIII. To the fixed collars 205, 206 are permanently connected the power leads 207, 208 that extend upward through the tubular portion 2a of the tether post 2, and emerge at the top where they are spliced into the power line wires 209, which, as depicted in Fig. II, are secured by suitable insulators 210 on a cross beam 211. Current is taken from the collector rings or fixed collars 205, 206 by brushes 212, 213 respectively set in holders 214 of insulation that span the opening into the swivel fitting 157 so as to be engageable by guide studs 215 let into the casting 151. Helical compression springs 216, surrounding the guide studs 215, serve to urge the brushes 212, 213 into good electric contact with the rings or fixed collars 205, 206, and the current thus taken is conducted by leads 217, 218 to a two pole snap switch 219 secured to the opposite end wall of the enclosure 150 within the upper section 151 of the latter.

The switch 219 is fully detailed in Figs. XXXIII-XXXVIII and will be observed to comprise a rotor 220 with wings 221, 222 adapted to bridge the gap between the opposing pole plates 223, 224, 225 and 226 that extend through insulation 227 molded into opposite sides of the switch casing 228. The protruding ends of the pole plates 224 and 226 are accessible, through apertures of an insulating bushing 229 in the end wall of the enclosure 150 (Fig. XXV), to enable connection of a plug 230 at the end of leads 231 extending from the conductors 19, 20. As shown in Fig. II, the inner ends of the conductors 19, 20 are removably attached by a hook 233, to an upwardly projecting bracket arm 234 of the enclosure casing 151. Referring again to Fig. XXV and also to Fig. XXVII, it will be noted that the actuating stem 235 of the two pole snap switch 219 protrudes through the top of the casing 151 where it is provided with a finger lever 236 for manual operation. Snap action of the two pole switch 219 is determined by bow springs 237, 238 (Figs. XXXIII, XXXIV and XXXVI) alternately influential upon an oscillating member 239 fast on the switch actuating stem 235. This oscillating member 239 carries top and bottom rollers 240, 241, which respectively, come to rest against the anchorage posts 242, 243 for the bow springs 237, 238 as the snap switch 219 is turned to open or closed position.

For the purpose of automatically controlling the two pole switch 219, I provide means as follows: Splined to the top of the feed screw 175 (Fig. XXV) with capacity for independent axial shifting, is a shaft extension 245 whose upper end has guidance in a bearing boss 246 on top of the enclosure casting 151. Secured to the shaft extension 245, immediately beneath the bearing 246, is an element 247 having arms 248, 249 in different vertical planes adapted to respectively engage the rollers 240, 241 on the oscillatable member 239 selectively, all in accordance with the shifting of said shaft extension and the direction of rotation of the screw 175 as more fully explained later. The leading edges of the arms 248, 249 of element 247 are quite sharp as depicted at 249a in Fig. XXXVII, and the rollers 240, 241 circumferentially grooved to insure precision of operation and definite selectivity as between the latter. Shifting of the shaft extension 245 is dependent upon automatically-induced longitudinal movement of the vertical rod 174 brought about, through engagement of collars 250, 251 thereon, by the spooling guide 172 as the latter approaches the limit of its travel in either direction, such movement being transmitted by a clevis arm 252 on the rod (Fig. XXV) engaging a circumferential groove in the enlargement 253 at the lower end of the shaft extension 245. The collars 250, 251 are split as shown in Fig. XXIX so as to be fixable by clamp screws 254 in different adjusted positions along the rod 174, but are held aligned against the possibility of independent rotation through engagement of integral lugs 255 in a longitudinal groove 174a in said rod. In addition to capacity for end on shifting, the rod 174 is rotatable in opposition to the torsion of the spring 189 so as to allow slight further reeling of the spooling guide 172 (as may be required in setting up or dismantling the apparatus) along marginal portions at opposite ends of the winding drum 165; said spooling guide 172 being, to this end, cut away top and bottom as at 172a to clear the lugs 255 on the stop collars 250, 251. An arm 256, pivoted for free vertical movement to ears 257 on the enclosure casting 151, has, at its outer end, an eye 258 through which the steering or guide wire 3 passes enroute to the winding drum 165. By engaging the steering or guide wire 3 at a distance in advance of the winding drum 165, the arm 256 serves not only to steady said wire, but at the same time obviates excessive lateral strain thereon due to the drag of the reeling mechanism 41 as it revolves about the tether post 2.

A bar 259 of insulation on the tractor element 1 (Figs. I and V), prevents electric contact of the conductors 19, 20 with any of the metallic parts. Spacers (which may be of bamboo or other suitable insulating material) diagrammatically represented at 260 in Fig I, are provided to prevent contact between the conductors 19, 20, said spacers being slidable for capacity to collect before the insulation rollers 68 (Figs. VIII and XII) of the reeling mechanism 41 as said conductors are drawn in by rotation of the winding drum 50.

The use and operation of my invention is as follows: The tractor element 1 is first placed in the desired position at the edge of the field to be operated upon, all manœuvering for this purpose being with the aid of the auxiliary internal combustion engine 39 to propel said element, and by manual guidance with the aid of the steering wheel 14. When the foregoing has been accomplished, the auxiliary motor or internal combustion engine 39 is stopped, and the handle 40a (Fig. V) thrown to unclutch the same. The box 150 enclosing the reeling mechanism 12 is next hung on the swivel fitting 157 of the tether post 2 and the handle 183 (Fig. XXV) moved to the illustrated position so as to free the winding drum 165 and thereby permit unreeling of the guide or steering wire 3, whereof the end is carried out and laid down temporarily within a few of the tractor element 1, so as to avoid closing the two pole snap switch 219 at this time. The conductors 19, 20 are thereupon withdrawn from the drum casing 41 and the insulating spacers 260 (Fig. I) properly allocated; and, when this has been done, the hook connection 233 adjacent the conductor ends is hooked to the bracket arm 234 of the reeling mechanism casing 150 (Fig. II), and the plug 230 pushed into the insulating socket 229, Fig. XXV. Following this, the spring motor 75 is wound up to the full extent by rotation of the winding crank handle 135 (Figs. V and XIX) to place the conductors 19, 20 under the maximum tension, and the hand wheel 137 (Fig. XIX) drawn up to clutch the worm gear 104. During unwinding of the conductors 19, 20 as above explained, it will be apparent that the rotative movement incidentally imparted to the screw shaft 71 will cause the nut 126 on the threaded end 71a of the latter to travel toward the left to a position m (Fig. XX); while rotation of the shaft 83 during winding is attended by travel of the nut 127 to the right to a position n on the threaded portion 83b of the said shaft 83. The operative then proceeds to further draw out the steering wire 3, and this is in due course attended by engagement of the spooling guide 172 (Fig. XXV) with the stop collar 250 and lifting of the the vertical rod 174. Such movement is imparted through the clevis arm 252, to the shaft extension 245 and the element 247 whose arm 248 is thus raised into the path of the bottom roller 241. Therefore, with further rotation of the feed screw 175, the arm 248 causes the oscillating member 239 to be tripped to close the circuit through the two pole snap switch 219. Then, with continued pull on the steering wire 3 and incident to further lifting of the vertical rod 174, the pivoted hook or catch 187 is tripped and the spur pinion 177 freed to the action of the compression spring 186 whereby it is shifted into mesh with the planetary gear 178. The reeling mechanism 12 being thus set in readiness for automatic operation, the steering wire 3 is finally made fast to the boom 11 of the tractor element 1.

All being now prepared, the starting box control lever 26 is moved in the direction of the arrow in Fig. V, and when the electric motor 21 has attained speed, the handle 37 is elevated to clutch the drive gearing 28 for the bull wheel 4, to said motor. Incidental to the ensuing travel of the tractor element 1, a reducing spiral course will be determined for it by virtue of the gradual taking up of the guide or steering wire 3 under automatic operation of the reeling mechanism 12 as the latter revolves about the tether post 2, in the manner previously described. Concurrently, the conductors 19, 20 are taken in through rotation of the winding drum 50 (Figs. VII, XII and XIII) under propulsion by the spring motor 75 and attending action of the differential gears 94, 98, 99, and said conductors are evenly laid on the drum 50 by cooperation of the spooling guides or rollers 68, 69 on the carriage 67, which, at this time, is progressively moving toward the right with reference to Figs. VII and VIII. As the operation proceeds, the nut 126 (Fig. XX) travels toward the right along the threaded end 71a of the shaft 71, while the nut 127 simultaneously travels toward the left on the threaded end 83b of the shaft 83. But, on account of the slow travel of the nut 126 as compared to the rapid unwinding of the spring motor 75 and rapid counter travel of the nut 127, the lever 125 is caused to swing on its pivot connection with the nut 126, aforesaid. As a consequence, the two-part member 128 is shifted toward the left as in Fig. XXIII permitting the tension springs 132 to draw the connecting rod 129 inwardly with reference to Figs. VII and XI for the purpose of clutching the shaft sections 105, 106 together. Rotation is thereupon immediately imparted to the shaft 83 (in a reverse direction) to partially rewind the spring motor 75 through medium of the differential gearing 94, 98 and 99. Such winding continues at a more rapid rate than unwinding until the nut 127 (Fig. XX) is advanced sufficiently toward the right to restore the lever 125 to the normal neutral position illustrated with the shaft sections 105, 106 unclutched and the winding drum 50 released once more to the action of the spring motor 75 unmodified by such rewinding. The operation just described is periodically repeated; but with each succeeding actuation, it will be seen that the return increments of the nut 127 (toward the right) are progressively reduced with impartation of less revolutions to the spring shaft 83 at each rewinding and corresponding gradual easement of the tension on the conductors 19, 20 as the tractor element 1 approaches the tether post 2. With this arrangement, it is therefore possible to begin with an initial tension on the conductors 19, 20, say in the neighborhood of eighty pounds for a starting span of 372 feet, and to decrease the same little by little to a minimum of ten pounds for an 18 ft. radius at the finish, so that undue sagging is prevented at all times without excessive strain.

With reference again to Fig. XXV it will be apparent that as the guide or steering wire 3 is drawn in by the winding drum 165, the spooling guide 172 is gradually moved downward along the vertical guide rod 174 under action of the feed screw 175. When the spooling guide rod 172 finally engages the collar 251 and thereby depresses the rod 174 in opposition to the spring 189, the shaft extension 245 is obliged to follow suit, bringing the arm 249 of element 247 (Figs. XXV, XXXIII, XXXIV and XXXVII) into the plane of the upper roller 240. Then, with continued rotation of the feed screw 175, the arm 249 will engage the roller 240 to automatically trip the two pole snap switch 219 and thus open the circuit to the electric motor 21 on the tractor element 1.

Having thus described my invention, I claim:

1. In agricultural apparatus of the character described, an independently-movable electrically-propelled tractor element adapted to travel a curvilinear course under guidance of a steering cable with reference to a fixed point in a field, and independent compensatively tensioned conductors to carry electric current to said tractor element from said fixed point.

2. In agricultural apparatus of the character described, an independently-movable tractor element automatically operated by a single electric motor and adapted to travel spirally under guidance of a steering cable about a fixed point in a field, independent conductors to carry electric current to said tractor element from said fixed point, and automatic means to compensatively reel the conductors.

3. In agricultural apparatus of the character described, an independently-movable tractor element automatically operated by a single electric motor and adapted to travel spirally inward under guidance of a steering cable with reference to a fixed point in a field, independent conductors to carry electric current to said tractor element from said fixed point, and automatic means operative to compensatively reel in the conductors incidental to decrease in the radius of travel.

4. In agricultural apparatus of the character described, an independently-movable electrically-propelled tractor element adapted to travel spirally inward with reference to a fixed point in a field, conductors to carry electric current to said tractor element from said fixed point, insulating spacers slidable on the conductors to normally maintain them separated, automatic mechanism to wind in the conductors, and associated means to incidentally detain and collect the spacers aforesaid.

5. In agricultural apparatus of the character described, an independently-movable electrically-propelled tractor element adapted to travel spirally about a fixed point in a field, conductors to carry electric current to said tractor element from said fixed point, slidable insulating spacers normally maintaining the conductors separated, automatic mechanism including a drum to reel the conductors, and associated means to incidentally detain the spacers for collection before the drum.

6. In agricultural apparatus of the character described, an independently-movable electrically-propelled tractor element adapted to travel spirally about a fixed point in a field, conductors to carry electric current to the said tractor element from the fixed point, and automatic means for maintaining varying tension on said conductors proportionate to changes in their span.

7. In agricultural apparatus of the character described, an independently-movable electrically-propelled tractor element adapted to travel a spiral course with reference to a fixed point in a field, conductors to carry electric current to said tractor element from said fixed point, and automatic mechanism to incidentally reel the conductors including a drum, a spring motor to rotate the drum, and interposed differential means enabling driving of the drum by the spring motor, and periodic rewinding of said spring motor.

8. In agricultural apparatus of the character described, an independently-movable electrically-propelled tractor element adapted to travel spirally about a fixed point in a field, conductors to carry current to said tractor element from said fixed point, and automatic mechanism to incidentally reel the conductors including a drum, a spring motor to rotate the drum, and associated automatic means to periodically rewind the spring motor.

9. In agricultural apparatus of the character described, an independently-movable electrically-propelled tractor element adapted to travel spirally about a fixed point in a field, conductors to carry current to said tractor element from said fixed point, and automatic mechanism to incidentally reel the conductors including a drum, a spring motor to rotate the drum, and associated automatic means for periodically rewinding the motor to maintain varying tension on said conductors proportionate to changes in their span.

10. In agricultural apparatus of the character described, an independently-movable electrically-propelled tractor element adapted to travel spirally about a fixed point in a field, conductors to carry current to said tractor element from said fixed point, and automatic mechanism to incidentally reel the conductors including a drum, a spring motor to rotate the drum, a transmission coordinated with the drive of the tractor element, and means controlling automatic coupling with said transmission to periodically rewind the spring motor.

11. In agricultural apparatus of the character described, an independently-movable electrically-propelled tractor element adapted to travel spirally about a fixed point in a field, conductors to carry current to said tractor element from said fixed point, and automatic mechanism to incidentally reel the conductors including a drum, a spring motor to rotate the drum, a transmission coordinated with the drive of the tractor element, and differential means controlling automatic coupling with said transmission to periodically rewind the spring motor for maintenance of varying tension on said conductors proportionate to changes in their span.

12. In agricultural apparatus of the character described, an independently-movable electrically-propelled tractor element adapted to travel a spiral course with reference to a fixed point in a field, conductors to carry electric current to said tractor element from said fixed point, and automatic means to incidentally reel said conductors including a drum with a spooling guide, a spring motor to rotate the drum, a transmission coordinated with the drive of the tractor element, a lever having pivotal connection with nuts travelling along differential threads respectively on the shafts of the spooling guide and the spring motor aforesaid, and a clutch controlled by said lever to effect periodic coupling of the transmission with the spring motor for partial rewinding to maintain varying tension on the conductors proportionate to changes in their span.

13. In agricultural apparatus of the character described, an independently-movable electric-motor-driven tractor element adapted to travel a spiral course under guidance of a steering cable with reference to a fixed point in a field, independent bare conductors to carry electric current to said tractor element from said fixed point, and automatic gear driven reeling mechanism on the tractor element including a drum with separate insulated sections to respectively receive the conductors, and brushes bearing on said drum sections to take off the current for supply to the motor on said tractor element.

14. In agricultural apparatus of the character described, an independently-movable tractor element automatically operated by a single electric motor, means to guide travel of said element, and independent means to conduct electric current thereto from a fixed point in the field.

15. In agricultural apparatus of the character described, a tractor element automatically operated by a single electric motor and adapted to travel over a curvilinear course under guidance of a steering cable about a tether post in a field, independent conductors to carry current to the tractor element, collector rings fixed on said post, and brushes in circuit with the conductors aforesaid moving in contact with the collector rings.

16. In agricultural apparatus of the character described, an independently-movable tractor element automatically operated by a single electric motor, a guide wire with take up means to define spiral travel of the element about a fixed point in a field, independent conductors carrying electric current from said fixed point to the tractor element, and automatic means to compensatively take up on the conductors incidental to changes in the span of the guide wire aforesaid during the spiral travel of the element.

17. In agricultural apparatus of the character described, an independently-movable tractor element automatically operated by a single electric motor, a steering cable to guide spiral travel of the tractor element, and a two pole snap switch to automatically cut off supply of electric current to the tractor element after a pre-determined period of travel.

18. In agricultural apparatus of the character described, an independently-movable electrically-propelled element, means to guide travel of the element, means to automatically cut off supply of electric current to the element after a pre-determined period of travel, and means whereby the period of such travel may be varied.

19. In agricultural apparatus of the character described, an independently-movable electrically-propelled element, a guide wire with reeling means to define spiral travel of the element about a fixed point in a field, independent conductors to carry current to the propelled element, and means associated with the aforesaid reeling means to automatically cut off supply of electric current to the propelled element after a pre-determined extent of spiral travel.

20. In agricultural apparatus of the character described, an independently-movable electrically-propelled tractor element and means defining spiral travel of the element about a fixed point in a field including a guide wire, a rotating drum to take up on the guide wire, means for spooling the wire on the drum, stops associated with said spooling means, and an electric switch subject to said stops in automatically cutting off supply of electric current to the tractor element after a pre-determined extent of spiral travel.

21. In agricultural apparatus of the character described, an independently-movable electrically-propelled tractor element adapted to travel a curvilinear course about a fixed point in a field under control of a radial guide wire, reeling mechanism for said guide wire, independent conductors bearing current to the tractor element, a two pole snap switch in the electric circuit carrying current for actuation of said tractor element, and means to automatically close the switch aforesaid after a predetermined extent of unreeling of the guide wire incidental to initial arrangement of the apparatus.

22. In agricultural apparatus of the character described, an independently-movable electrically-propelled tractor element adapted to travel a spiral course about a fixed point in a field under control of a radial guide wire, mechanism to automatically reel said guide wire during spiral travel of the tractor element, independent conductors bearing current to the tractor element, a two pole snap switch in the electric circuit carrying current for actuation of said tractor element, and means to close the switch aforesaid and to set the reeling apparatus for automatic operation after a predetermined extent of unreeling of the guide wire incidental to initial arrangement of the apparatus.

23. In agricultural apparatus of the character described, an independently-movable electrically-propelled tractor element adapted to travel a spiral course about a fiexd point in a field under control of a radial guide wire, automatic mechanism, including a drum and driving connections to reel said guide wire during travel of the tractor element, a switch in the electric circuit carrying current for actuation of the tractor element, and means to close the switch aforesaid and to clutch the reeling drum with its driving connections for automatic operation after a predetermined extent of unreeling of the guide wire incidentally to initial arrangement of the apparatus.

In testimony whereof, I have hereunto signed by name at Philadelphia, Pennsylvania, this second day of July, 1926.

HERBERT I. WASHBURN.